United States Patent [19]

Rennick

[11] 3,780,218

[45] Dec. 18, 1973

[54] CIRCUIT FOR ESTABLISHING CORRECT HUE SETTING IN COLOR TELEVISION USING VIRS SIGNAL

[75] Inventor: John L. Rennick, Elmwood Park, Ill.

[73] Assignee: Zenith Radio Corporation, Chicago, Ill.

[22] Filed: Aug. 20, 1971

[21] Appl. No.: 173,439

[52] U.S. Cl. .......... 178/5.4 HE

[51] Int. Cl. .......... H04n 9/46

[58] Field of Search .......... 178/5.4 HE

[56] References Cited

UNITED STATES PATENTS

| | | | |
|---|---|---|---|
| 3,551,591 | 12/1970 | Nakamura et al. | 178/5.6 |
| 3,598,902 | 8/1971 | Davis et al. | 178/7.3 DC |
| 3,679,816 | 7/1972 | Avins et al. | 178/5.4 HE |
| 3,456,068 | 7/1969 | Wilhelmy | 178/5.4 HE |
| 3,673,320 | 6/1972 | Carnt et al. | 178/5.4 HE |

*Primary Examiner*—Benedict V. Safourek

*Assistant Examiner*—George G. Stellar

*Attorney*—John J. Pederson and Nicholas A. Camasto

[57] ABSTRACT

A circuit arrangement for a color television receiver for indicating correct hue control setting by utilizing a VIR signal component included as part of the received television signal. A differential amplifier is gated on during the occurrence of the VIR signal whereby an appropriate output of the receiver's demodulator, e.g., the R-Y color-difference output, is compared with a suitable reference voltage and a control voltage developed if there are any phase differences between the chrominance reference information included in the VIR signal and the color burst signal controlling the output frequency of the reference oscillator. In one embodiment a metering circuit is connected between respective outputs of the differential amplifier as a visual indication for setting the conventional viewer-operated hue control. In another embodiment, a closed or phase locked loop is utilized to effect any necessary hue corrections automatically.

1 Claim, 5 Drawing Figures

CIRCUIT FOR ESTABLISHING CORRECT HUE SETTING IN COLOR TELEVISION USING VIRS SIGNAL

BACKGROUND OF THE INVENTION

The present invention relates in general to circuit improvements for color television receivers and more particularly to a novel circuit arrangement for establishing correct hue control setting in such receivers by utilizing a VIR signal component included in the transmitted television signal.

Under present day NTSC standards, the brightness information of a television image is transmitted by the luminance signal, amplitude modulated on a main carrier, while that information necessary to reproduce the color content is transmitted by a phase and amplitude modulated sub-carrier wave. To properly demodulate the chroma information, the color carrier must be regenerated at some appropriate location within the receiver, and to that end, a signal component or "burst" of the color carrier is included in the transmitted television signal. The color burst signal, of about eight cycles or so in duration, is utilized at the receiver to selectively control the output frequency of the reference oscillator serving as the carrier regenerator.

A particular problem in effecting optimum color imagery relates to the maintenance of the appropriate reference conditions so as to obtain correct hue and saturation in the reproduced picture. Incorrect reference conditions gives rise to incorrect color reproduction. For example, phase errors in the demodulation processing will result in incorrect hue. The phase errors may be the result of non-linearities in the receiver itself or they may be introduced in the televised signal prior to reception by the receiver. In any event, if the errors are pronounced, some degree of compensation must be effected. Compensation or correction may be effected at either the transmitting location or at the receiver, or both.

To avoid, or at least minimize, signal generating errors at the transmitting location, a further and additional reference component has been proposed in addition to the conventional color burst component. This reference signal is commonly referred to as a vertical interval reference signal, or VIR signal. As the name would imply, it is a signal component included in the transmitted television signal only during the time of predetermined vertical intervals. For example, a common practice has been to include the VIR signal on line 20 of the televised image. However, it could be included on some other line, for example, line 20 or line 19, or perhaps on both line 20 and 21 to cover both fields. In any event, representation of the proposed VIR signal is illustrated graphically in FIG. 2. As shown, normal blanking and synchronization pulses are included along with the color burst components. In the video or horizontal trace interval, however, a chrominance reference signal or bar is included of approximately 24 microseconds duration, along with a luminance reference of approximately 12 microseconds. The scale is arbitarily in IRE units wherein the magnitude between blanking level and zero carrier constitutes 100 units. The chrominance reference comprises a signal component at the 3.58 mHz color carrier frequency, but some three times the duration of the conventional color burst.

Accordingly, in the event that errors are introduced during the process of generating the television signal, adjustments may be made at the transmitting site to restore the VIR signal component to the condition as shown in FIG. 2 which, in theory, will effect suitable compensation for the remaining signal components and thereby ensure an optimized television signal. To say it somewhat differently, if there are operational differences in the cameras used at the studio site, or if there are non-linearities in the propagation path between studio and transmitting sites, differences in phase between burst and chroma may well result. By looking at the VIR signal component and making suitable adjustments to obtain the reference conditions illustrated in FIG. 2, the entire television signal will, in theory, be restored to its optimized state. This is particularly significant with respect to the color burst component. Since it is of a relatively short duration, difficulty in determining its precise phase, and thus determining whether any errors are present, is not uncommon. In still another aspect, the utilization of a VIR signal component of specific composition provides a ready and convenient standard for uniformity between different television stations.

Notwithstanding a suitably optimized signal may be processed and transmitted at a central station, there is no guarantee that a suitably optimized television image will be reproduced at the receiver location. Errors can be introduced in the propagation path between station and receiver, by the transmission line between receiving antenna and receiver, and by the receiver itself if non-linearities are present to a significant degree. This is particularly so with respect to the color burst component. Compensation can of course be effected for hue variations by suitable adjustment of the viewer-operated hue control. However, other than making a value judgment as to correct fleshtone that may be present in the reporoduced image, there is no objective standard to indicate correct hue control setting. Moreover, any adjustments must be made manually.

Accordingly, it is an object of the present invention to provide a novel circuit arrangement for establishing correct hue control setting in a color television receiver by utilizing a VIR signal component included in the transmitted television signal.

Another object of the present invention is to provide a novel circuit arrangement of the foregoing type wherein a visual indication of the correct hue control setting may be conveniently and readily effected.

Still another object of the present invention is to provide a novel circuit arrangement of the foregoing type wherein needed adjustments to the hue of reproduced images may be accomplished electronically and automatically.

A more particular object of the present invention is to provide a novel circuit arrangement of the foregoing type wherein a portion of the receiver demodulator in response to a VIR signal component included in the received television signal may be utilized for developing a control voltage indicative of any phase errors between such VIR component and the output of the receiver reference oscillator providing the regenerated color carrier.

SUMMARY OF THE INVENTION

In accordance with one embodiment of the present invention, a line selector apparatus is used to gate on a differential amplifier at the appropriate line in the televised signal at which the included VIR signal component is present. The differential amplifier has one of its pair of inputs coupled to the R-Y color-difference output of the receiver chroma demodulator and the other of its inputs coupled to a reference voltage indicative of "no signal" output of the demodulator. Accordingly, assuming "by the book" demodulation, a control voltage will be developed between the respective outputs of the differential amplifier if there are differences between the color burst signal controlling the output frequency of the reciever's reference oscillator and the reference information in the VIR signal component, but no differential voltage if the signals are the same. This results since the VIR signal component is in minus B-Y phase thereby generating a zero output from the R-Y demodulator by virtue of the quadrature relation thereto. By including a meter between the respective outputs of the differential amplifier, a visual indication is readily provided with respect to the correct hue control setting. A correct setting is indicated by a null reading on the meter.

In still another embodiment, the metering circuit may be eliminated and a closed or phase locked loop may be included to electronically and automatically adjust for correct hue control setting. The viewer operated hue control may be completely eliminated or retained if a manual override is desired.

BRIEF DESCRIPTION OF THE DRAWINGS

The features of the present invention which are believed to be novel are set forth with particularity in the appended claims. The invention itself, however, together with fruther objects and advantages thereof, may be best understood by reference to the following description taken in conjunction with the accompanying drawings, in which:

DESCRIPTION OF THE PREFERRED EMBODIMENTS

Figure 1:
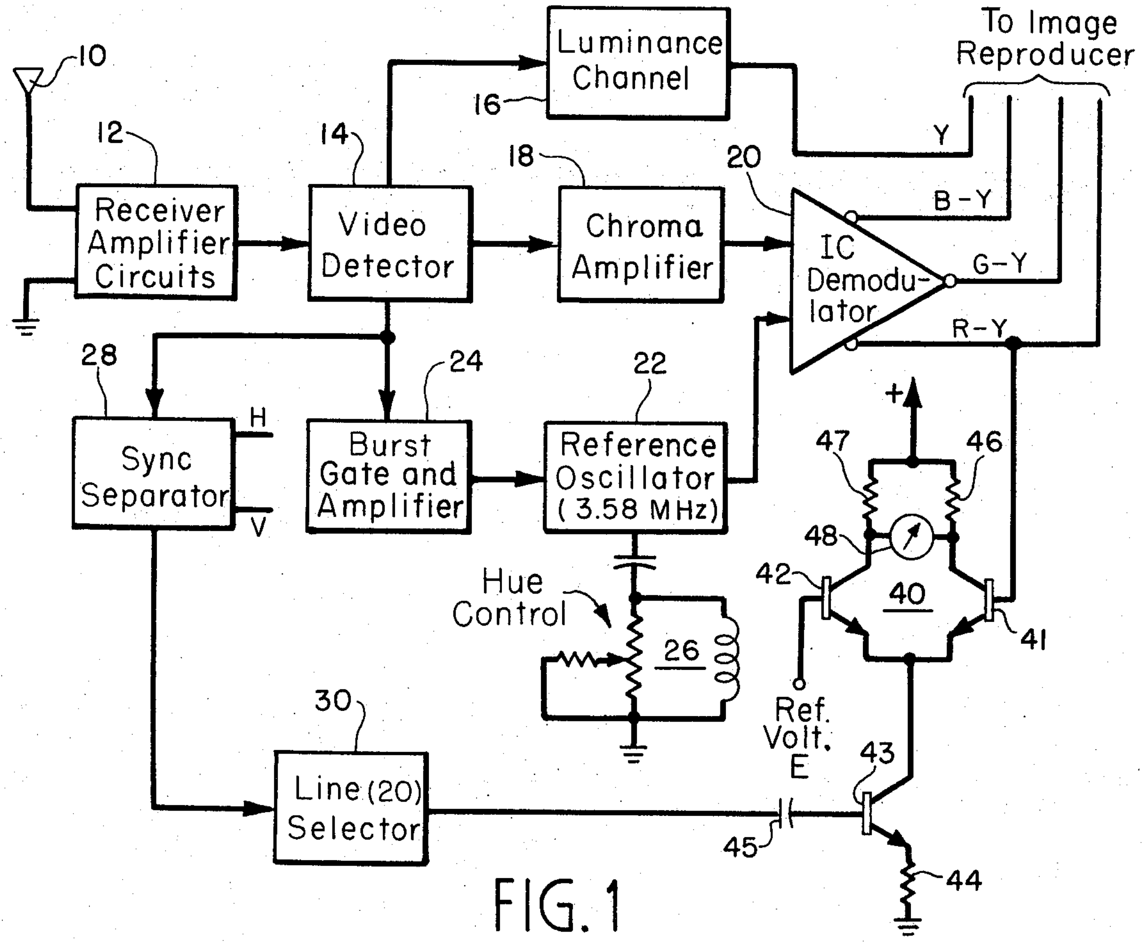
FIG. 1 is a partial schematic and block diagram of a color television receiver which has been constructed in accordance with the present invention.

Referring now to the drawings, a partial schematic and block diagram of a color television receiver is shown in FIG. 1 which includes a particular embodiment of the present invention. Only those receiver stages and particularized circuitry are shown in FIG. 1 which are deemed necessary to an understanding of the invention. Those skilled in the art have a sufficient understanding of the operating characteristics of a color television receiver and the stages and components not specifically detailed in FIG. 1.

As shown in FIG. 1, the television receiver includes an antenna 10 for intercepting a color transmission and applying the same to the receiver circuits designated in block from at 12. These circuits comprise the customary turnable front end, oscillator modulator, and one or more stages of intermediate frequency amplification. The amplified signal is applied to a video detector 14 where a composite video signal is derived containing the brightness and chrominance information. The brightness or luminance information is applied through a luminance channel 16 to a color image reproducer (not shown), while the chrominance signal is applied to a chrominance channel which, inter alia, includes a suitable chroma amplifier 18 and a demodulator arrangement indicated generally at 20. The demodulator 20, upon receiving the chrominance information as one input thereto and the appropriate regenerated chroma carrier as another input, derives the necessary color components thrugh demodulation and matrixing prior to application to the image reproducer. In this instance, the color components are shown as color difference signals, R-Y, B-Y and G-Y. The regenerated chroma carrier required as a demodulating signal is developed in a local color reference oscillator 22, appropriately synchronized in a known manner by the color burst component derived by the burst gate and amplifier 24 from the composite video signal received from video detector 14. All of the circuitry represented by the receiver stages as thus far described should not be necessary.

A hue control circuit 26 is associated with the output of the reference oscillator 22, the operation of which is likewise understood in the art. Circuit 26 is essentially a phase shifting network for varying the phase of the color reference signal generated by oscillator 22 relative to the repetitive burst signal, and in this sense, serves as a limited range vernier adjustment with respect to the hue of the reproduced image as a whole. As thus described, hue control circuit 26 is adjusted by the viewer to obtain the appropriate fleshtone colors in the reproduced image in accordance with individual preferences. Of course, if there are no fleshtones present at the particular time, then some other standard must be arbitrarily chosen. In any event, it is to be emphasized that the particular setting of the hue control is dependent upon a value judgment rather than some fixed standard.

An objective standard, however, is provided by the present invention for determining the correct hue control setting. The circuit arrangement contemplates utilizing the included VIR signal component. This reference signal, as previously mentioned, has been proposed for inclusion at some appropriate vertical interval in the televised signal but prior to the visual portion of the reproduced image. For example, the VIR signal component may be included at line 20. If the VIR signal component can be suitably extracted from the composite video signal, the reference information may then be utilized as a convenient standard to determine if errors are present, particularly with respect to hue and saturation levels in the reproduced image.

To this end, a line selector 30 is provided to monitor all received television signals and effect a suitable gating signal at the appropriate time, or in this case, line 20 of the television signal. Line selector 30 may be coupled to any convenient source of composite video signal, such as the sync separator for the receiver, identified generally at 28. Line selector 30 may be any suitable counting arrangement known in the art provided it has the further capability of generating a gating signal at an appropriate count, i.e., line 20.

One such counter arrangement is shown in block diagram form in FIG. 4 and which includes four interconnected multivibrator or flip-flop stages 32 forming a binary counter 31 having a binary count capability of $2^0$, $2^1$, $2^2$, $2^3$, or a decimal equivalent of 15, sufficient for the purpose intended as will be explained subsequently. Counter 31 is conditioned at a predetermined time interval to count successive horizontal flyback pulses as applied to its input (i.e., the $2^0$ flip-flop stage), as indicated. Counting action is initiated upon a suitable gating or conditioning signal being applied to the respective stages 32 from a further flip-flop stage or gate 34, in turn being activated by a sync integrator circuit, identified at 35. Selective outputs of counter stages 32 are coupled to a logic element 36 which generates an output signal at an appropriate count level indicative of a selected line in the field or fields of the reproduced image.

The sync integrator 35 may be an R-C network of conventionalized design known in the art such that detailed description is deemed unnecessary. Sync integrator 35 provides an output signal when the incoming train of sync pulses in the processed television signal is integrated to a potential level of a predetermined value. For example, in the embodiment shown in FIG. 4, it has been found that a suitable gate "on" signal may be developed by sync integrator 35 upon integrating the series of pulses contained in the first equalizing interval in the composite sync train pulses those contained in the vertical sync interval. Each of these pulse intervals (first equalizing interval and the vertical sync interval) encompass a time base corresponding to three horizontal line intervals, or a total of six horizontal flyback pulses. Since binary counter 31 is designed to count horizontal flyback pulses, this corresponds to a count level of "six" for the counter, and in turn line six in either of the two scanning fields.

With the generation of an output or gate "on" signal from sync integrator 35 (at count level six), the binary counter 31 is thus conditioned to begin counting horizontal flyback pulses beginning at a count level corresponding to line seven. Since counter 31 has a count capability of up to 15, a suitable output signal from logic element 36 may be generated corresponding to any line in each scanning field from line seven to line 22, and is accomplished by suitable interconnection between logic element 36 and respective counter stages 32. In the case at hand, an output signal is desired corresponding to line 20. Accordingly, this is readily effected by the selective interconnection of logic element 35 and the various counter stages 32 in the manner shown in FIG. 4 whereby a control or enabling signal is developed at each of the four inputs to logic element 36 at, but only at, a count level of 14. The resultant signal at the ouput of logic element 35 thereby corresponds to line 20 in the scanning field.

To prevent counter 31 from simply recycling and continuing counting action on succeeding lines past line 22, a gate "off" signal is generated to disable the counter 31 on the horizontal flyback pulse following the count level of 15. This is accomplished by the R-C network 38–39 which generates a pulse to serve as a gate "off" signal upon the $2^3$ counter stage switching to its alternate bi-level state. The counter thus remains disabled until the sync train in the next succeeding field of the processed television signal is suitably integrated to effect a gate "on" signal at the output of the sync integrator 35.

It is to be understood that the foregoing is merely illustrative of one method of providing the desired line selection action. Other arrangements are of course possible and will be readily apparent to those skilled in the art.

As further shown in FIG. 1, the receiver includes a differential amplifier circuit, identified generally at 40. A pair of transistors 41 and 42 are interconnected in conventional differential amplifier fashion, with a further transistor 43 having its collector-emitter path interposed between the junction of emitters of transistors 41 and 42 and a plane of reference potential (ground). A resistance 44 serves as an emitter load while resistances 46 and 47 serve as the collector loads for transistors 41 and 42, respectively. Resistances 46 and 47 are coupled to a source of undirectional potential to provide suitable operating power. Finally, a meter 48 is connected between the collectors of transistors 41 and 42.

In operation, the output of line selector 30 is coupled to the base input of transistor 43 through a coupling capacitor 45. Transistor 43 operates as a "gated" current source for the differential amplifier arrangement formed by transistors 41 and 42. The output or gating signal developed by line selector 30 serves to render transistor 43 conductive during the active part of line 20 containing the VIR signal component.

At the same time, the VIR component is processed through the receiver in the conventional manner. That is, the chrominance reference information contained in the interval between horizontal sync pulses on line 20 is passed through the chroma amplifier 18 and applied to one input of the demodulator 20, while the color burst signal is routed through burst gate and amplifier 24 and applied to reference oscillator 22. The output of oscillator 22, upon being applied to the other input of demodulator 20, enables suitable demodulation and matrixing action to take place, with the resultant color-difference control signals appearing at each of the demodulator outputs, B-Y, G-Y and R-Y, respectively. As will be apparent, only one of the demodulator outputs, namely, the R-Y output, need be utilized for purposes of the present invention.

Figure 2:
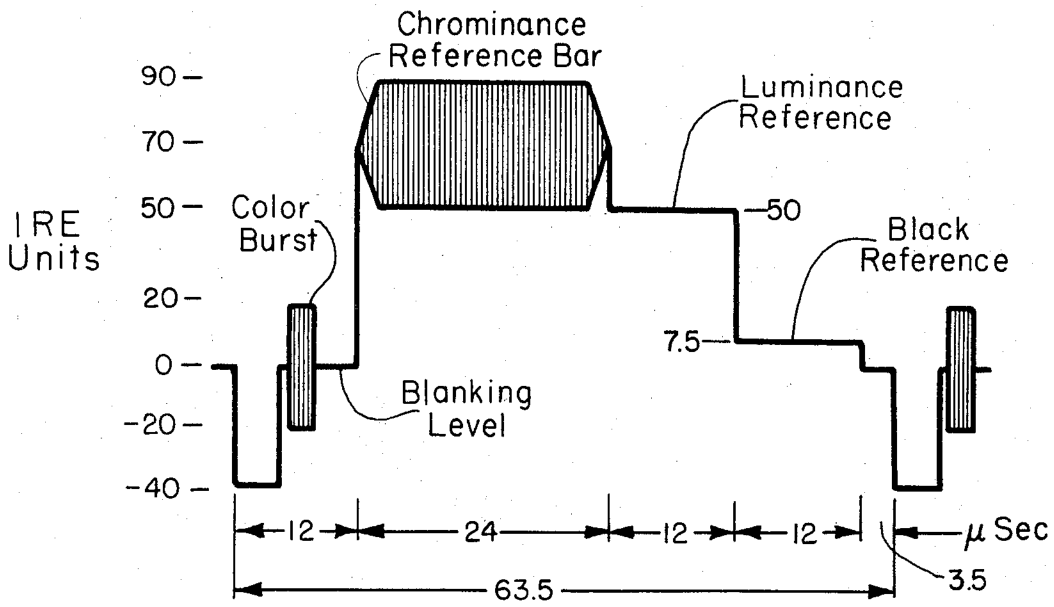
FIG. 2 is a graphic representation of the VIR signal component proposed to be included as part of the televised signal and which is useful in understanding various aspects of the invention.
Figures 4, 5:
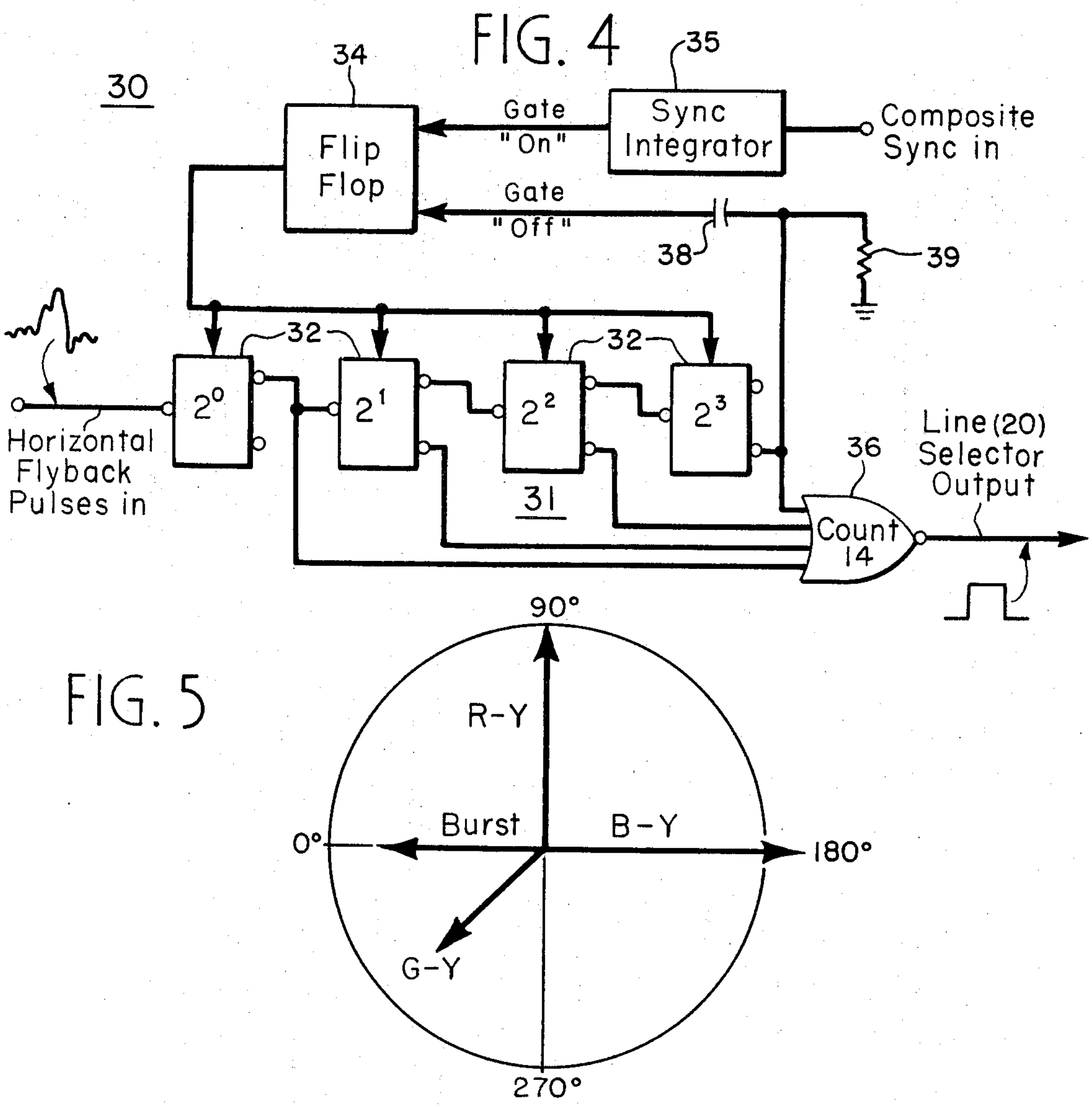
FIG. 4 is a block diagram of a binary counter and related circuitry suitable as a line selector and which generates a gating signal at the appropriate count.
FIG. 5 is a vector diagram of the color burst signal and the various color-difference outputs of the receiver demodulator useful in understanding certain aspects of the invention.

As depicted graphically in FIG. 5, the respective demodulator outputs are at different phase references, or more properly, at different demodulation angles, with respect to one another and also with respect to that of the color burst component. Although somewhat different in actual practice, the R-Y output is shown in quadrature (90°) with the burst component while the B-Y output is at 180°, or minus phase. The same holds true for the chrominance reference information (FIG. 2), since it is the same in phase and frequency with the burst component. Accordingly, the demodulation of the reference information on line 20 constituting the VIR signal will, in accordance with known demodulation practices, produce an output signal at the B-Y and G-Y demodulator outputs but no signal at the R-Y output if, and only if, the burst component is at the proper zero phase reference. If it is not, then an appropriate signal will be generated at the R-Y demodulator output since the required quadrature relation no lnoger obtains. It is this operational characteristic which is utilized to provide an indication of correct hue control setting.

As shown in FIG. 1, one input of the differential amplifier, for example the base input of transistor 41, is coupled to the R-Y output of demodulator 20. The other input of the differential amplifier, in this instance, the base input of transistor 42 is coupled to a predetermined reference voltage source E, the value of whch is chosen to equal the no signal output, or quiescent operating level, of the demodulator during this time. Accordingly, the meter 48 interconnecting the collector electrodes of transistors 41 and 42 provides a direct indication for proper setting of the hue control circuit 26. That is, a zero or null will obtain to indicate the optimum setting of the control if the output of the reference oscillator 22 is the same in frequency and phase as that of the chrominance reference information included in the VIR signal component. Any variations therefrom will generate a reading on the meter 48, the numerical value being dependent upon the degree of error present. The correct hue setting can be obtained at any time by simply adjusting the potentiometer in the hue control circuit 26 until a null is obtained on the meter.

Of course, if preferred, the required adjustments to hue can be effected automatically, thereby eliminating the viewer operated control circuit entirely. One such arrangement for doing so is shown in block diagram form in FIG. 3. Instead of the outputs of the differential amplifier being utilized to drive a metering circuit, they may instead be incorporated in a closed loop system whereby any necessary hue adjustments are accomplished electronically and automatically. The closed loop essentially comprises the reference oscillator 22, demodulator 20, differential amplifier circuit 40 and a phase control arrangement 50 in lieu of the previous hue control circuit 26. The included phase control 50 may be any suitable circuitry configuration known in the art as long as it is capable of utilizing the respective outputs of the differential amplifier circuit 40 to develop a control signal for changing the output frequency of the reference oscillator 22 in a direction until a zero or no signal condition obtains at the R-Y output of the demodulator 20. A more detailed treatment of a closed or phase-lock arrangement which may be adapted for use in the present invention is referenced in U.S. Letters Patent, 3,585,285, granted June 15, 1971 to John L. Rennick for a Subcarrier Regeneration System, and assigned to the same assignee as the present invention.

Figure 3:
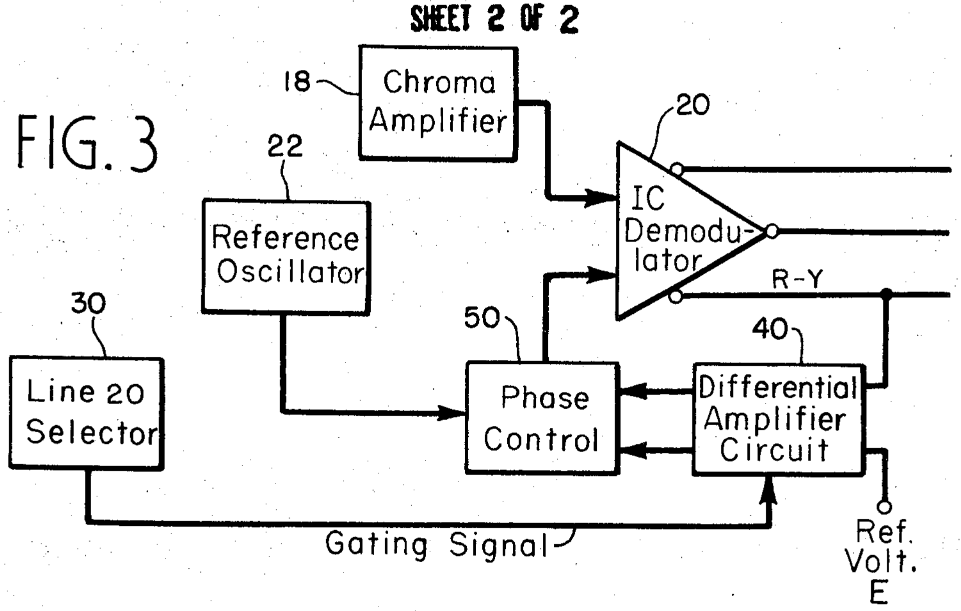
FIG. 3 is a partial schematic and block diagram of a color television receiver which includes another embodiment of the present invention.

The embodiment as shown in FIG. 3 operates for the most part in essentially the same fashion as that set forth above with respect to the embodiment of FIG. 1. That is, a suitable gating signal is developed by line selector 30 at the appropriate line containing the VIR signal component, which gates on differential amplifier circuit 40. The chrominance information contained in the VIR signal component is processed through the receiver and applied to the demodulator 20 along with the regenerated color carrier developed by reference oscillator 22. If there is a variance between the reference oscillator output and the chrominance reference extracted from the VIR signal, a differential voltage is developed by circuit 40 which, when applied to the phase control circuit 50, generates a suitable control signal to change the output frequency of the oscillator 22. The output frequency of oscillator 22 continues to change until there is a no signal condition reached at the R-Y output of the demodulator 20, representative of the correct hue setting for the television receiver. The necessary changes in this instance, however, are made automatically and electronically without manual control.

While particular embodiments of the present invention have been shown and described, it of course will be obvious to those skilled in the art that certain changes and modifications may be effected without departing from the invention in its broader aspects, and, accordingly, the intent of the appended claims is to cover all such changes and modifications as fall within the true spirit and scope of the invention.

I claim:

1. In a color television receiver having means for receiving and demodulating color television signals including sync pulse information, luminance information, suppressed subcarrier chrominance information, color burst information and a VIR component, said VIR component containing chrominance reference information and occurring on line 20 during the vertical retrace interval; oscillator means regenerating the chrominance subcarrier under frequency control of said color burst; color signal demodulating means developing color difference signals from said regenerated subcarrier and said chrominance information, said color signal demodulating means producing a known output when the phase of said regenerated subcarrier and said chrominance reference are identical; signal generating means for producing a signal equivalent to said known output; hue control means for adjusting the relative phase between said regenerated subcarrier and said chrominance information; comparison means including a pair of transistors arranged as a differential amplifier for comparing the output of said color signal demodulating means with said known ouput from said signal generating means and producing a signal representative of phase discrepancies between said chrominance reference and said regenerated subcarrier to enable corrective adjustments of said hue control means; sync pulse separating means; and line selector means energizing said differential amplifier in said comparison means during occurrence of said VIR component; said line selector means comprising: means for counting 20 sync pulses, including sync pulse integrator means coupled to said sync pulse separating means, a flip flop, a source of horizontal flyback pulses and a normally disabled binary counter coupled to count said horizontal flyback pulses; said sync pulse integrator means triggering said flip flop upon receipt of six sync pulses in the first equalizing pulse interval and the vertical sync interval during said vertical retrace interval in response to an output of said flip flop and initiating counting in said binary counter; said binary counter including logic means for producing an energizing pulse output in response to said counter achieving a count of 14 corresponding to receipt of 14 additional sync pulses to render the differential amplifier in said comparsion means operational; said line selector means further including a switching transistor coupled between said logic element and said differential amplifier, and arranged to control the conductivity of said differential amplifier; and means including a resistor and a capacitor, coupled to said binary counter and responsive to said binary counter attaining said count of 14 for generating a pulse for resetting said flip flop to its initial state.

* * * * *